(12) United States Patent
Srinivasa et al.

(10) Patent No.: US 8,443,437 B2
(45) Date of Patent: May 14, 2013

(54) METHOD AND APPARATUS FOR ENFORCING LOGICAL ACCESS SECURITY POLICIES USING PHYSICAL ACCESS CONTROL SYSTEMS

(75) Inventors: Srinath Malur Srinivasa, Karnataka (IN); Venkatesh Viswanathan, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 874 days.

(21) Appl. No.: 12/426,406

(22) Filed: Apr. 20, 2009

(65) Prior Publication Data

US 2010/0269173 A1    Oct. 21, 2010

(51) Int. Cl.
*G06F 7/04*    (2006.01)

(52) U.S. Cl.
USPC ............................................................. 726/20

(58) Field of Classification Search .................... 726/20, 726/9, 27; 713/172; 380/44, 46; 340/541
See application file for complete search history.

(56) References Cited

U.S. PATENT DOCUMENTS

| | | | |
|---|---|---|---|
| 6,385,729 B1 | 5/2002 | DiGiorgio et al. | |
| 6,835,729 B2 * | 12/2004 | Miller et al. | 514/217.07 |
| 7,865,738 B2 * | 1/2011 | Buck et al. | 713/184 |
| 7,882,552 B2 * | 2/2011 | Kipnis et al. | 726/9 |
| 7,969,302 B2 * | 6/2011 | Srinivasa et al. | 340/541 |
| 8,028,083 B2 * | 9/2011 | Audebert et al. | 709/238 |
| 8,090,853 B2 * | 1/2012 | Brown et al. | 709/229 |
| 2004/0255131 A1 * | 12/2004 | Guthery | 713/189 |
| 2005/0278775 A1 * | 12/2005 | Ross | 726/2 |
| 2006/0064587 A1 * | 3/2006 | Braverman | 713/168 |

* cited by examiner

*Primary Examiner* — Beemnet Dada
(74) *Attorney, Agent, or Firm* — Husch Blackwell

(57) ABSTRACT

A method and apparatus for providing a security system. The method includes the steps of providing an identity card for use by a person entering a secured area of the security system, reading the identity card at an entry point to the secured area, randomly generating an alphanumeric key upon the occurrence of a predetermined event, writing the alphanumeric key into the identify card at the entry point, reading the card within the secured area as a request for access to a computer and granting access to the computer by the person, but only when an alphanumeric key is found on the card that matches the generated alphanumeric key.

12 Claims, 1 Drawing Sheet

METHOD AND APPARATUS FOR ENFORCING LOGICAL ACCESS SECURITY POLICIES USING PHYSICAL ACCESS CONTROL SYSTEMS

FIELD OF THE INVENTION

The field of the invention relates to security systems and more particularly to methods of controlling access to computers.

BACKGROUND OF THE INVENTION

Security systems for computers are generally known. In a single user system, the first time that a user activates his computer, a security application prompts the user for a password. Once entered, passwords function to protect the user's data from access by other users.

In networked systems, a number of computers may be interconnected in a local area network (LAN) or wide area network (WAN). At least some computers within the network may operate as servers to provide any of a number of different types of functionality. Access to the network may be gained by connecting a terminal (e.g., a personal computer (PC)) having an appropriate operating system (e.g., Windows) to the network.

In order to control access to the network, a system manager may create a user profile for each user. The user profile may define a set of rights and privileges that have been granted to each user. The rights and privileges may define which servers a user is allowed to access and the extent that a user is allowed to access and/or change the data within a server. Associated with the user profile may be a user name and password.

In order to sign into a network, a user may activate his/her terminal and may be presented with a sign-in screen. The user may enter his/her name and password and be granted access to the system.

While user access to such systems by using a name and password is effective, it is not foolproof. Some users seldom change their passwords or use passwords that can be easily identified. Because of the importance of user access, a need exists for better methods of controlling the use of names and passwords.

DETAILED DESCRIPTION OF AN ILLUSTRATED EMBODIMENT

Figure 1:
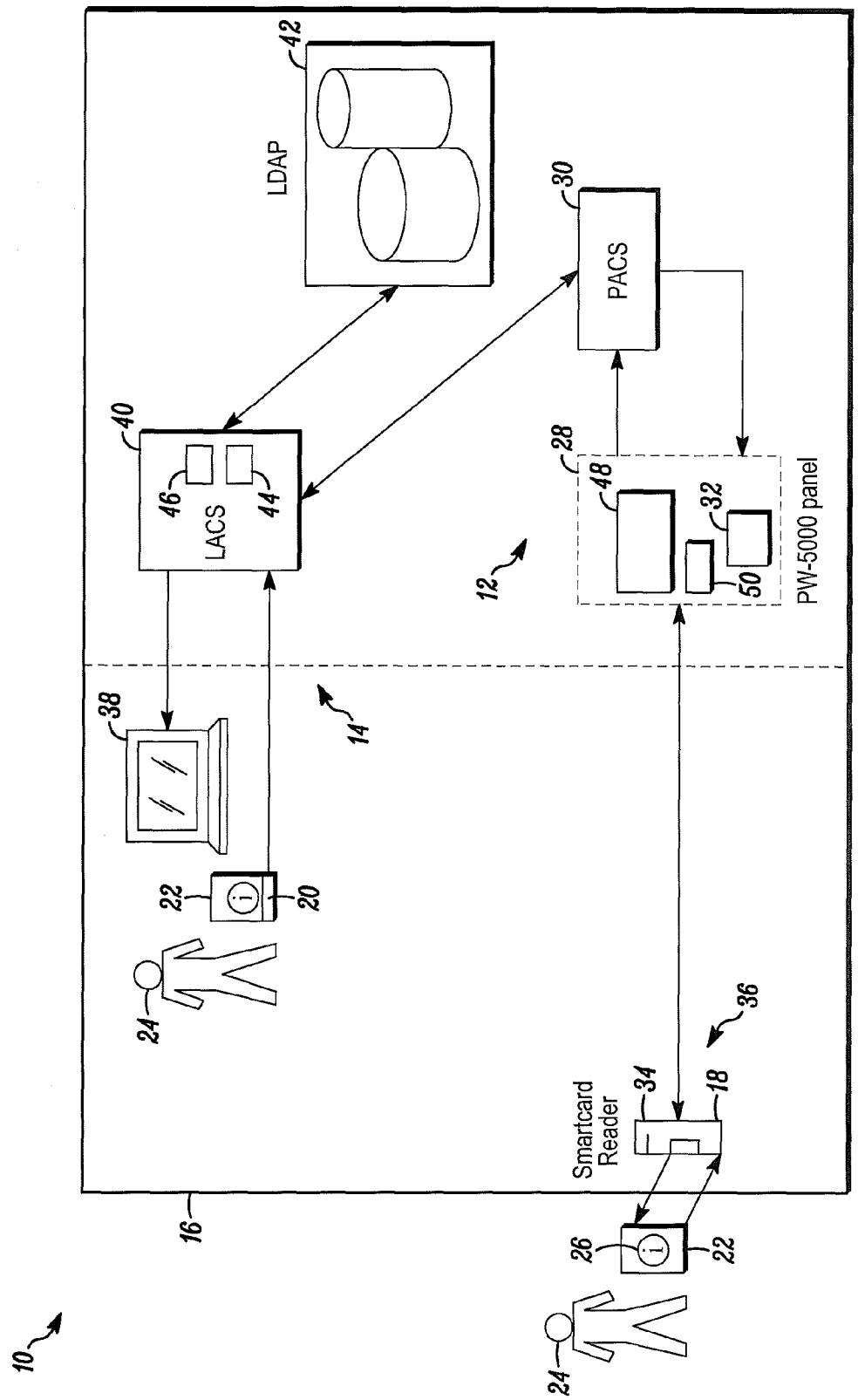
FIG. 1 is a block diagram of a security system shown generally in accordance with an illustrated embodiment of the invention.

FIG. 1 is a block diagram of a security system 10 shown generally in accordance with an illustrated embodiment of the invention. Included within the security system 10 is a networked computer system 14 and a building security system 12. The building security system 12 is used to control access to a secured area 16.

Included within the security system 12 may be a processor 28 and a physical access controls system (PACS) server 30. Also included within the security system 12 may be a card reader 18.

Under the illustrated embodiment, an organization that controls the secured area 16 may issue an access and identification card 22 to each person 24 that is to be provided access to the secured area 16. In order to access the secured area 16, an authorized person 24 inserts the access card 22 into a card reader 18. The card reader 18 reads an indicia of identity 26 within the access card 22 and transfers the indicia of identity to the security processor 30 as an access request.

The security processor 30 may receive the indicia 26 and attempt to identify a reference file 32 of an authorized user 24. In this regard, the processor 30 may search a local database or transfer the indicia 26 to the PACS server 30.

Once the reference file 32 has been located, the processor 30 may use the content of the file 32 to determine whether the card has been previously reported as stolen and, possibly perform other security checks. If the card had not been reported as stolen and the access request passes the other security checks, the processor 30 may activate an access feature (e.g., a lock) 34 allowing access of the person 24 through an access point (e.g., a door) into the secured area 16.

Other security checks may include retrieval of an image of the person 24 or other biometric data about the person. A biometric reader (not shown) such as a camera with face recognition software or a fingerprint reader may also be situation near the access point 36 and used to verify the identity of the person 24.

Once allowed into the secured area 16, the person 24 may be required to access the computer system 14 in order to perform their job function. In order to gain access to the computer system 14, the person may again use their access card 22. In this case, the person 24 may pass the card 22 through a card reader 20 associated with a local terminal 38. The person 24 may also be required to separately enter a password through a keyboard (not shown) on the terminal 38.

In this case, the indicia 26 within the card 22 that was previously read by the security system 12 may also contain a user name and a password. If the person 24 is required to enter a password through the keyboard, then the password within the card 22 may be the primary password while the password entered through the keyboard is a secondary password.

In this case, the card reader 30 may transfer the name and password(s) to a logical access control system (LACS) 40, either directly or through the local terminal 38. The LACS 40 receives the name and password and transfers the name and password to an authentication application 44 within the LACS 40. The authentication application 44 may use the identifier and password(s) to identify a user file 46. If the user name and password(s) from the card reader 20 and/or terminal 38 match the content of the file 46, the person 24 is granted access to the computer system 14.

Under illustrated embodiments of the invention, the security system 12 is used in conjunction with the computer system 14 to ensure the periodic updating of the primary password. In order to ensure the frequent updating of passwords, the detection of an access card 22 within a card reader 18 is used as a trigger to determine whether a new password should be generated. For example, the detection of a card 22 within the card reader 18 may be used to determine whether a predetermined event has occurred. Upon the occurrence of the predetermined event a new password is generated that is, in turn, embedded within the access card 22. The predetermined event may be the passage of a predetermined time period (e.g., 24 hours) or may even be the simple presentation of the card to the card reader 18.

In any event, the presentation of the card causes the processor 28 to first verify the validity of the card 22. Verification of the card 22 may include checking whether an identifier read from the card is included within a list of valid user numbers.

Once the card has been verified, then the processor 28 may then determine whether the predetermined event has occurred. If the predetermined event has occurred, then the processor may generate a new password and save the password on the access card 22.

New passwords may be generated using a random number generator 48. In this case, the processor 28 may activate the random number generator 48 to generate an alpha-numeric sequence for use as a password 50 of an appropriate length (e.g., 10 bytes). The generated sequence may be saved onto the access card 22.

In addition to generating a password 50, the processor 28 may save the password 50 into the user file 46. When the person 24 next signs into the computer system 14, the authentication application 44 compares the password 50 saved onto the card 22 with the password 50 saved in the user file 46. If a match is found, then the person 24 is allowed access to the computer system 14. If not, then the user is denied access.

The use of the security system 12 to generate passwords 50 significantly improves the security of the computer system 14. By periodically generating and saving passwords 50 onto the access cards 22 and using the access cards 22 for gaining entry to the computer system 14, it becomes far less likely that users are able to share passwords or that unauthorized persons can gain entry to the computer system 14.

The use of the security system 12 to generate passwords 50 increases the security of the system 10 on a number of different levels. For example, the occurrence of the predetermined event can be set as appropriate to the security risk. While passwords could be generated each time the person 24 enters the secured area 16, new passwords 50 could also be generated once a week or based upon some other risk factor.

Moreover, the generation of passwords 50 may be leveraged by the security system 12. For example, if the card reader 18 is used in conjunction with a biometric detector, then the identify of the person 24 could be verified independently of use of the card 22 for gaining entry into the computer system 14.

A specific embodiment of method and apparatus for automatically generating passwords has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of operating a security system comprising:
providing an identity card for use by a person entering a secured area of the security system;
a first card reader reading the identity card at a point of physical entry of the person into the secured area;
a random number generator of the security system randomly generating an alphanumeric key upon the occurrence of a predetermined event;
the first card reader writing the alphanumeric key into the identify card at the entry point;
a second card reader reading the card within the secured area as a request for access to a computer;
a logical access control system granting access to the computer by the person, when an alphanumeric key is found on the card that matches the generated alphanumeric key; and
the logical access control system denying access to the computer by the person when an alphanumeric key is found on the card that does not match the generated alphanumeric key;
wherein the predetermined event further comprises reading of the identity card at the entry point and wherein any preexisting alphanumeric keys are deleted each time an alphanumeric key is written into the identify card.

2. The method of operating the security system as in claim 1 further comprising providing indicia of identity of the person on the card.

3. The method of operating the security system as in claim 1 wherein the indicia of identity further comprises an image of the person.

4. The method of operating the security system as in claim 1 wherein the card further comprises a smartcard.

5. A security system comprising:
an identity card for use by a person entering a secured area of the security system;
first means for reading the identity card at a point of physical entry by the person into the secured area;
means for randomly generating an alphanumeric key upon the occurrence of a predetermined event;
means for writing the alphanumeric key into the identify card at the entry point;
second means for reading the card within the secured area as a request for access to a computer;
means for granting access to the computer by the person, when an alphanumeric key is found on the card that matches the generated alphanumeric; and
means for denying access to the computer by the person when an alphanumeric key is found on the card that does not match the generated alphanumeric key;
wherein the predetermined event further comprises reading of the identity card at the entry point and wherein any preexisting alphanumeric keys are deleted each time an alphanumeric key is written into the identify card.

6. The security system as in claim 5 further comprising means for providing indicia of identity of the person on the card.

7. The security system as in claim 5 wherein the indicia of identity further comprises an image of the person.

8. The security system as in claim 5 wherein the card further comprises a smartcard.

9. A security system comprising:
an identity card for use by a person entering a secured area of the security system;
a first card reader of the security system that reads the identity card at a point of physical entry by the person into the secured area;
a random number generator of the security system that generates an alphanumeric key upon the occurrence of a predetermined event;
the first card reader that writes the alphanumeric key into the identify card at the entry point;
a second card reader of a logical access control system coupled to the security system that reads the card within the secured area as a request for access to a computer;
an authentication application of the logical access control system that grants access to the computer by the person, when an alphanumeric key is found on the card that matches the generated alphanumeric key; and
the authentication application of the logical access control system that denies access to the computer by the person when an alphanumeric key is found on the card that does not match the generated alphanumeric key;

wherein the predetermined event further comprises reading of the identity card at the entry point and wherein any preexisting alphanumeric keys are deleted each time an alphanumeric key is written into the identify card.

10. The security system as in claim 9 further comprising means for providing indicia of identity of the person on the card.

11. The security system as in claim 9 wherein the indicia of identity further comprises an image of the person.

12. The security system as in claim 9 wherein the card further comprises a smartcard.

* * * * *